United States Patent [19]

Pernyeszi

[11] 4,333,133
[45] Jun. 1, 1982

[54] POWER SOURCE WITH AN ELECTRONIC IMPEDANCE CHANGER

[75] Inventor: Joseph Pernyeszi, Fairfield, Conn.

[73] Assignee: International Telephone and Telegraph Corporation, New York, N.Y.

[21] Appl. No.: 189,470

[22] Filed: Sep. 22, 1980

[51] Int. Cl.³ .................. H02M 3/00; H02P 13/18
[52] U.S. Cl. ........................... 363/15; 363/96; 363/97
[58] Field of Search ............... 363/19, 21, 23, 25, 363/26, 28, 72, 86, 96, 97, 98; 321/15

[56] References Cited

U.S. PATENT DOCUMENTS 4,146,832  3/1979  McConnell ............... 363/19 X

Primary Examiner—William M. Shoop
Attorney, Agent, or Firm—John T. O'Halloran; Alfred C. Hill; Jeffrey P. Morris

[57] ABSTRACT

A circuit arrangement to provide a fixed voltage source in series with an arbitrarily chosen impedance of any magnitude and phase shift having very low power dissipation and capable of being fabricated on silicon integrated chips is disclosed. The circuit arrangement includes a sensing resistor to sense the output current of a power converter which is amplified and fed back with an appropriate phase shift to control the output voltage of the converter. An independent control signal may be combined with the fed back voltage to change the chosen impedance to another type of impedance.

23 Claims, 5 Drawing Figures

POWER SOURCE WITH AN ELECTRONIC IMPEDANCE CHANGER

BACKGROUND OF THE INVENTION

The present invention relates to a power source and more particularly to a circuit arrangement to provide a fixed voltage source in series with an arbitrarily chosen impedance of any magnitude and phase angle.

In the line interface circuit of a telephone switching system, it is often necessary to power the telephone line from a voltage source through some fairly large series impedance. The impedance may be real, reactive or a combination of the two. In an effort to reduce the cost of the line interface circuit, it is desireable to fabricate as much of the circuitry as possible on silicon integrated circuit chips. Thus, the voltage source may be integrated as a switching power converter. Large reactive impedances, on the other hand, cannot be integrated and large resistive impedances in series with the power converter output would dissipate too much power to integrate. Furthermore, it is desirable to substantially eliminate the power dissipation due to the series resistance because of the ever increasing cost of energy and the reduced system reliability due to excessive heat.

SUMMARY OF THE INVENTION

An object of the present invention is to provide a circuit arrangement that will enable achieving all of the above goals.

Another object of the present invention is to provide a circuit arrangement providing a fixed voltage source in series with an arbitrarily chosen impedance of any magnitude and phase angle.

A further object of the present invention is to provide a circuit arrangement providing a fixed voltage source in series with an arbitrarily chosen impedance of any magnitude and phase angle which may be varied depending upon whether the circuit arrangement is providing power for ringing or talking.

A feature of the present invention is the provision of a circuit arrangement to provide a fixed voltage source in series with an arbitrarily chosen impedance of any magnitude and phase angle comprising: a power converter providing an output current and output voltage; first means coupled to the output of the converter to sense the output current; second means coupled to the first means for amplifying the sensed output current and imparting a predetermined phase shift thereto to provide a control voltage; and third means coupled to the second means and the converter to couple the control voltage to the converter to control the output voltage thereof.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
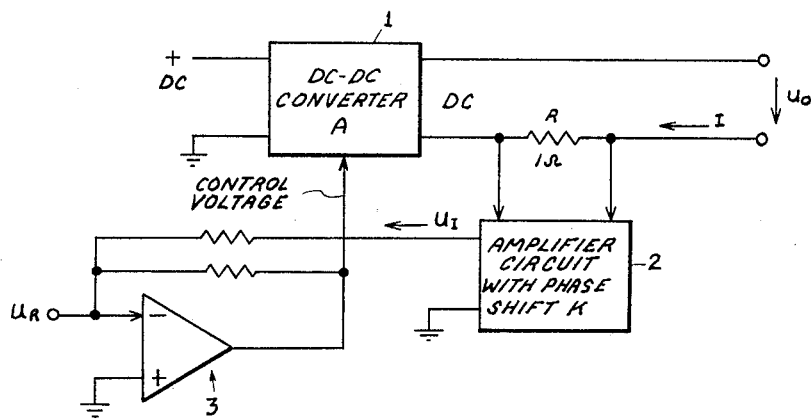
FIG. 1 is a block diagram of a circuit arrangement in accordance with the principles of the present invention.

Referring to FIG. 1, the circuit arrangement of the present invention includes a DC-DC converter 1 which has its output current sensed by resistor R. This sensed current is amplified in the amplifier circuit 2 and has an appropriate phase shift imparted thereto to produce a control voltage which may be coupled either directly to converter 1 to control the output voltage of converter 1, or through a summing amplifier 3 which combines with the control voltage an independent control signal for control of the impedance presented by the circuit arrangement of FIG. 1 in response to ringing signal or voice frequency.

The result is that the output of the converter appears to be a fixed voltage source in series with an arbitrarily chosen impedance of any magnitude and phase angle which may be varied or adjusted by the independent control signal, depending upon whether the voltage output of the circuit is for ringing or for talking. Yet because the circuit is basically a voltage converter operating at high efficiency, power dissipation in the circuit will be very low even when an apparently large resistance is in series with the output.

The voltage output of circuit 2 is $U_I = IK_0 e^{j\phi}$, where I is the sensed current at the output of converter 1 and $K_0 e^{j\phi} = K$ of circuit 2, where $K_0$ is the amplification factor of circuit 2, e base of natural logarithms = 2.71828, $j = (-1)^{\frac{1}{2}}$ and $\phi$ is equal to the phase shift of circuit 2. The output voltage $U_0 = -A(U_R + U_I) = -A(U_R + IK_0 e^{j\phi}) = -AU_R - AK_o e^{j\phi} I$, where A is the transfer function of the converter 1, $U_R$ is the control signal and Z is the impedance of this circuit of FIG. 1 equal to $AK_o e^{j\phi}$.

Figure 2:
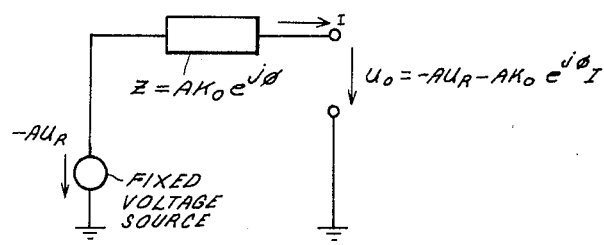
FIG. 2 is an equivalent circuit of the block diagram of FIG. 1.

The equivalent circuit of FIG. 1 derived from these equations is shown in FIG. 2. From the above equations, it can be seen that the impedance Z is dependent on the circuit parameters and can be adjusted to any value. This includes both the magnitude and the phase of impedance. The circuit of FIG. 1 has good efficiency, since the DC-DC converter has very little dissipation and the sensing resistor R can be a low value, such as, in the order of 1 ohm. The output voltage is variable with $U_R$. In fact, the circuit of FIG. 1 provides an amplifier with any source impedance.

Figure 3:
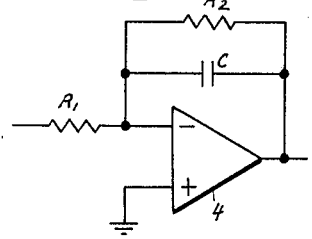
FIG. 3 illustrates an amplifier circuit which imparts a phase shift to the sensed current at the output of the converter which renders the impedance Z of the circuit arrangement of FIG. 1 inductive.
Figure 4:
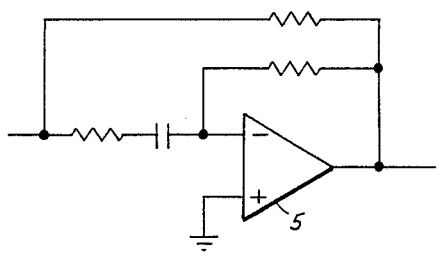
FIG. 4 illustrates an amplifier circuit to provide a phase shift for the sensed current at the output of the converter of FIG. 1 that renders the impedance Z of the circuit arrangement of FIG. 1 capacitive.
Figure 5:
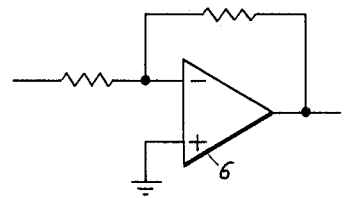
FIG. 5 illustrates an amplifier circuit to provide a zero phase shift for the sensed current at the output of the converter of FIG. 1 that renders the impedance Z of the circuit arrangement of FIG. 1 resistive.

Amplifier circuit 2 can be implemented many different ways with three of these circuits being shown in FIGS. 3–5.

Referring to FIG. 3, the circuit illustrated therein includes a differential amplifier 4 having connected thereto as illustrated resistors $R_1$ and $R_2$ and capacitor C. The value K for circuit 2 in the embodiment illustrated in FIG. 3 is derived as follows.

$$K = -\frac{R_2 \times \frac{1}{jwc}}{R_1} = -\frac{R_2}{R_1} \cdot \frac{1}{1 + jwR_2C}$$

for frequencies where $WR_2C \gg 1$ $$K = -\frac{R_2}{R_1} \frac{1}{jwR_2C} = -\frac{1}{jwR_1}$$

making Z inductive.

Referring to FIG. 4, the differential amplifier 5 and the resistors and capacitors connected thereto as illustrated provides a phase shift in circuit 2 which renders the overall circuit of FIG. 1 to have an impedance Z which is capacitive.

Referring to FIG. 5, there is shown therein an amplifier circuit including differential amplifier 6 with the resistors connected thereto as illustrated which provides no phase shift in circuit 2 and thereby renders the overall circuit of FIG. 1 to have an impedance Z which is resistive.

It is also possible to use nonlinear feedback to make the magnitude and/or the phase of impedance Z dependent on the output level. For example, impedance Z can look like a choke for low output currents and capacitive for high currents.

In telephone applications, the output can be resistive while delivering ringing and inductive while providing talking battery. The impedance Z that is presented by the circuit arrangement of FIG. 1 can be changed or synthesized depending upon the frequency of the control signal $U_R$. Employing the circuit of FIG. 5 in circuit 2 of FIG. 1 and with the control signal $U_R$ being a ringing signal, the impedance Z of the circuit of FIG. 1 would be resistive. When $U_R$ changes to a talking frequency, the impedance of the arrangement of FIG. 1 with the circuit of FIG. 5 employed for amplifier circuit 2 will render the impedance Z of FIG. 1 inductive.

While I have described above the principles of my invention in connection with specific apparatus it is to be clearly understood that this description is made only by way of example and not as a limitation to the scope of my invention as set forth in the objects thereof and in the accompanying claims.

I claim:

1. A circuit arrangement to provide a fixed voltage source in series with an arbitrarily chosen impedance of only magnitude and phase angle comprising:
   a power converter providing an output current and output voltage;
   first means coupled to the output of said converter to sense said output current;
   second means coupled to said first means for amplifying said sensed output current and imparting a predetermined phase shift thereto to provide a control voltage; and
   third means coupled to said second means and said converter to couple said control voltage to said converter to control said output voltage thereof.

2. A circuit arrangement according to claim 1, further including
   a control signal coupled to said third means for combining with said control voltage to change said chosen impedance to another type of impedance.

3. A circuit arrangement according to claim 2, wherein
   said first means is a resistor in series with the output of said converter.

4. A circuit arrangement according to claim 3, wherein
   said resistor has a low resistance value.

5. A circuit arrangement according to claim 4, wherein
   said resistance value is approximately one ohm.

6. A circuit arrangement according to claims 3, 4 or 5, wherein
   said second means includes
      an amplifier circuit having said predetermined phase shift to provide an inductive impedance for said chosen impedance.

7. A circuit arrangement according to claim 6, wherein
   said third means includes
      a summing circuit.

8. A circuit arrangement according to claim 6, wherein
   said third means includes
      a summing amplifier circuit.

9. A circuit arrangement according to claims 3, 4, or 5, wherein
   said second means includes
      an amplifier circuit having said predetermined phase shift to provide a capacitive impedance for said chosen impedance.

10. A circuit arrangement according to claim 9, wherein
    said third means includes
       a summing circuit.

11. A circuit arrangement according to claim 9, wherein
    said third means includes
       a summing amplifier circuit.

12. A circuit arrangement according to claims 3, 4, or 5 wherein
    said second means includes
       an amplifier circuit having said predetermined phase shift equal to zero to provide a resistive impedance for said chosen impedance.

13. A circuit arrangement according to claim 12, wherein
    said third means includes
       a summing circuit.

14. A circuit arrangement according to claim 12, wherein
    said third means includes
       a summing amplifier circuit.

15. A circuit arrangement according to claim 1, wherein
    said first means is a resistor in series with the output of said converter.

16. A circuit arrangement according to claim 15, wherein
    said resistor has a low resistance value.

17. A circuit arrangement according to claim 16, wherein
    said resistance value is approximately one ohm.

18. A circuit arrangement according to claims 15, 16 or 17, wherein
    said second means includes
       an amplifier circuit having said predetermined phase shift to provide an inductive impedance for said chosen impedance.

19. A circuit arrangement according to claim 18, wherein
    said third means includes
       a conductor coupled between the output of said amplifier circuit and said converter.

20. A circuit arrangement according to claims 15, 16 or 17, wherein said second means includes
 an amplifier circuit having said predetermined phase shift to provide a capacitive impedance for said chosen impedance.

21. A circuit arrangement according to claim 20, wherein
 said third means includes
  a conductor coupled between the output of said amplifier circuit and said converter.

22. A circuit arrangement according to claims 15, 16 or 17, wherein
 said second means includes
  an amplifier circuit having said predetermined phase shift equal to zero to provide a resistive impedance for said chosen impedance.

23. A circuit arrangement according to claim 22, wherein
 said third means includes
  a conductor coupled between the output of said amplifier circuit and said converter.

* * * * *